United States Patent Office 3,663,586
Patented May 16, 1972

3,663,586
CYCLIC THIOUREA DERIVATIVES AND PROCESS FOR THEIR MANUFACTURE
Hans Dietrich Golitz, Cologne-Stammheim, Rudolf Merten, Leverkusen, Walter Noll, Opladen, and Walter Simmler, Odenthal-Globusch, Germany, assignors to Farbenfabriken Bayer Aktiengesellschaft, Leverkusen, Germany
No Drawing. Filed Oct. 16, 1970, Ser. No. 81,513
Claims priority, application Germany, Apr. 13, 1970, P 20 17 507.9
Int. Cl. C07f 27/10
U.S. Cl. 260—448.2 N
13 Claims

ABSTRACT OF THE DISCLOSURE

Novel cyclic thiourea derivatives containing silicon atoms have the general formula

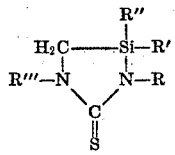

wherein R is a hydrocarbon radical optionally being interrupted by oxygen atoms in ether linkages, R' and R" (same or different) are hydrocarbon radicals, halohydrocarbon radicals, cyanohydrocarbon radicals, or alkoxy radicals, and R''' is a hydrocarbon radical. The compounds are useful as cross-linking agents and as intermediates for carbofunctional siloxanes.

These 2,5-diaza-3-silacyclopentathiones can be produced, according to the invention, by reacting an aminomethylalkoxysilane of the general formula

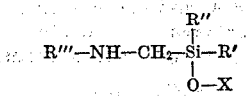

(R', R" and R''' as above; X=alkyl) at a temperature between 0 and 250° C. with an isothiocyanate of the general formula RNCS (R as above) and recovering the product by distillation under reduced pressure or by filtration.

These products are suitable as intermediates for carbofunctional organopolysiloxanes and as cross-linking agents in water-reactive organopolysiloxane preparations.

---

The present invention relates to new cyclic thiourea derivatives containing silicon atoms, which derivatives are suitable for use as intermediates in the manufacture of carbofunctional organopolysiloxanes and as cross-linking agents in organopolysiloxane compositions which can be converted into elastomers at room temperature by reaction with water.

These new thiourea derivatives are 2,5-diaza-3-silacyclopentanethiones of the general formula

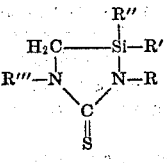

wherein

R is a saturated aliphatic or cycloaliphatic, olefinic or aromatic hydrocarbon radical having at most 15 carbon atoms, which is optionally interrupted by one or more ether oxygen atoms, R' and R" (which are the same or different) are optionally halogen-substituted or cyano-substituted saturated aliphatic or cycloaliphatic, olefinic or aromatic hydrocarbon radicals having at most 10 carbon atoms, or alkoxy radicals having 1 to 4 carbon atoms, and
R''' is a saturated aliphatic or cycloaliphatic, olefinic or aromatic hydrocarbon radical having at most 10 carbon atoms.

These heterocyclic compounds may be produced, according to the invention, by reacting an aminomethylalkoxysilane of the general formula

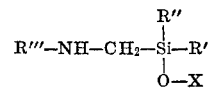

wherein R', R" and R''' are as above and X is an alkyl radical having 1 to 4 carbon atoms, at a temperature between 0 and 250° C., and optionally in an inert solvent, with an equimolar amount, or an excess of up to 100%, of an isothiocyanate of the general formula RNCS, wherein R is as above, and isolating the reaction products by fractional distillation under reduced pressure or by filtration.

The aminomethylalkoxysilanes to be used in the above process may be obtained according to known methods, for example by reaction of a halogenomethylalkoxysilane with a primary amine. The entire process then takes place in accordance with the following reaction scheme:

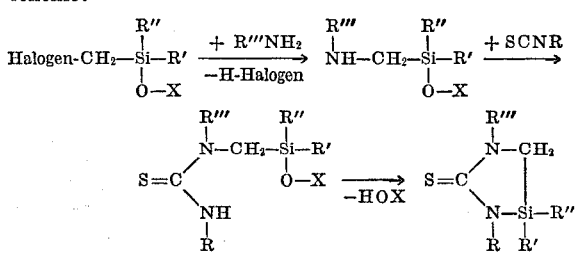

Surprisingly, the alkoxysilylmethylthioureas which are first produced in accordance with the known principle of an isocyanate addition, cyclize in the last step of this reaction sequence at a moderately elevated temperature, as a rule at between 20 and 250° C., with elimination of alcohol. Some of the heterocyclic compounds thus formed are solid at room temperature and can be isolated from inert solvents, for example toluene, by filtration and evaporating off under reduced pressure the residual alcohol and solvent adhering to the filter residue. As a rule, however, the reaction mixture will be distilled at a pressure of between 0.01 and 100 mm. of mercury and the products according to the invention are obtained as yellow to yellow-brown, liquid distillates in a yield of between 50 and 90%.

The cyclic compounds which can be manufactured in the manner described all have an unpleasant odor and can easily be split hydrolytically at their Si—N and Si—O bonds; on prolonged action of water, the Si—CH$_2$ bond is also broken with the formation of N-methyl-substituted thio-urea derivatives.

The following examples are given for the purpose of illustrating the invention.

EXAMPLE 1

108 g. (0.5 mol) dimethyl-(cyclohexylaminomethyl)-ethoxysilane are dissolved in 150 cm.$^3$ toluene and 68 g. (0.5 mol) phenyl isothiocyanate are added to this solution at a temperature of between 20 and 30° C., with exclusion of moisture and whilst stirring. The solid white reaction product which thereby precipitates is separated from the solution by filtration, and the filter residue is washed with toluene and freed of residual toluene under reduced pressure. The product which remains melts at between 165 and 167° C., and its structure corresponds to the formula

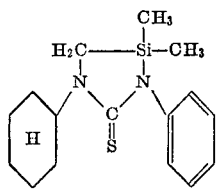

EXAMPLE 2

41 g. (0.3 mol) phenyl isothiocyanate are added dropwise to 73.5 g. (0.3 mol) methyl-(cyclohexylaminomethyl)-diethoxysilane with exclusion of moisture and whilst stirring, the temperature being kept at between 10 and 20° C. by external cooling, and thereafter stirring is continued for a further hour. The reaction mixture is then distilled and in doing so a fraction passing over at between 190 and 200° C. in the pressure range of 0.07 to 0.1 mm. of mercury is obtained, which is solidifies to crystals on cooling. The light yellow product melts at between 60 and 61° C. and has the structural formula

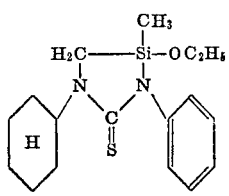

EXAMPLE 3

275 g. (1 mol) (cyclohexylaminomethyl)-triethoxysilane are dissolved in 100 cm.³ toluene and 135 g. (1 mol) phenyl isothiocyanate are added dropwise to this solution with exclusion of moisture and whilst stirring, at a temperature of between 25 and 45° C. Thereafter the reaction mixture is distilled whilst reducing the pressure and at 0.5 mm. of mercury and 204° C. a yellow fraction, which on cooling solidifies to crystals and melts between 70 and 71° C., is obtained, having a structure in accordance with the formula

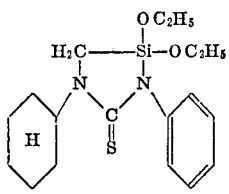

EXAMPLE 4

49.5 g. (0.5 mol) allyl isothiocyanate are added dropwise to 137.5 g. (0.5 mol) (cyclohexylaminomethyl)-triethoxysilane with exclusion of moisture and whilst stirring, the temperature being kept at between 10 and 20° C. by external cooling. Subsequent distillation yields, in the pressure range of 0.4 to 0.6 mm. of mercury and between 160 and 169° C., a light brown, oily fraction of refractive index $n_D^{20}=1.5248$, and of structure in accordance with the formula

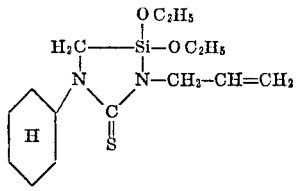

EXAMPLE 5

47 g. (0.2 mol) (allylaminomethyl)-triethoxysilane are allowed to react with 27 g. (0.2 mol) phenyl isothiocyanate in an analogous manner to that described in Example 4, and the product is distilled. At 1.1 to 1.2 mm. of mercury and between 193 and 197° C., a yellow, oily fraction of refractive index $n_D^{20}=1.5640$ is obtained, of structure in accordance with the formula

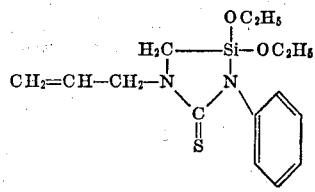

EXAMPLE 6

46.5 g. (0.173 mol) (phenylaminomethyl)-triethyloxysilane are mixed with 20 g. (0.173 mol) n-butyl isothiocyanate, and the mixture is heated to 200° C. for 6 hours and is then distilled. A red-brown, oily fraction is obtained in the pressure range of 0.5 to 0.8 mm. of mercury and between 160 and 176° C., having a refractive index $n_D^{20}=1.5264$, and of structure in accordance with the formula

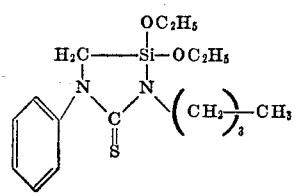

EXAMPLE 7

47.6 g. (0.173 mol) methyl-(n-butylaminomethyl)-di-n-butoxysilane are allowed to react with 20 g. (0.173 mol) isobutyl isothiocyanate in an analogous manner to that described in Example 4, and the product is distilled at 0.9 mm. of mercury. Between 170 and 176° C. a yellow, oily fraction is obtained, having a refractive index $$n_D^{20}=1.5043$$

and a structure in accordance with the formula

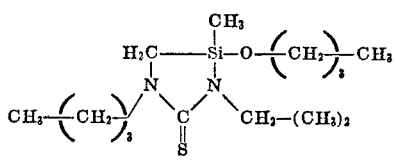

What is claimed is:
1. 2,5 - diaza-3-silacyclopentanethiones of the general formula

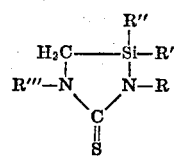

wherein
R is a monovalent radical having up to 15 carbon atoms and being selected from the group consisting of saturated aliphatic, cycloaliphatic, olefinic, and aromatic hydrocarbon radicals and radicals composed of carbon, hydrogen and oxygen in the form of an ether linkage,
R' and R" are monovalent radicals being independently from one another selected from the group consisting of alkoxy radicals having 1 to 4 carbon atoms and hydrocarbon radicals having up to 10 carbon atoms, said hydrocarbon radicals being selected from the group consisting of saturated aliphatic, cycloaliphatic, olefinic, aromatic, halogen substituted saturated aliphatic, halogen substituted cycloaliphatic, halogen substituted olefinic, halogen substituted aromatic, cyano substituted saturated aliphatic, cyano substituted olefinic and cyano substituted aromatic hydrocarbon radicals, and R''' is a hydrocarbon radical having up to 10 carbon atoms and being selected from the group consisting of saturated aliphatic, cycloaliphatic, olefinic and aromatic hydrocarbon radicals.

2. Process for the manufacture of a 2,5-diazo-3-silacyclopentanethione according to claim 1 which comprises reacting an aminomethylalkoxysilane of the general formula

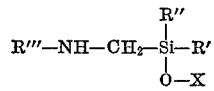

wherein X is an alkyl radical having 1 to 4 carbon atoms, with an amount being from the equimolar proportion to an excess of up to 100% of an isothiocyanate of the general formula RNCS, at a temperature between 0 and 250° C., and isolating the reaction products.

3. Process according to claim 2, wherein the reaction is effected in an inert solvent.

4. Process according to claim 2 wherein said isolating of the reaction products is effected by fractional distillation under reduced pressure.

5. Process according to claim 4 wherein the fractional distillation is carried out at a pressure of 0.01 to 100 mm. of mercury.

6. Process according to claim 2 wherein said isolating of the reaction products is effected by filtration.

7. 2 - phenyl-3,3-dimethyl-5-cyclohexyl-2,5-diaza-3-silacyclopentanethione.

8. 2 - phenyl-3-methyl-3-ethoxy-5-cyclohexyl-2,5-diaza-3-silacyclopentanethione.

9. 2 - phenyl-3,3-diethoxy-5-cyclohexyl-2,5-diaza-3-silacyclopentanethione.

10. 2 - allyl-3,3-diethoxy-5-cyclohexyl-2,5-diaza-3-silacyclopentanethione.

11. 2 - phenyl-3,3-diethoxy-5-allyl-2,5-diaza-3-silacyclopentanethione.

12. 2 - n-butyl - 3,3-diethoxy-5-phenyl-2,5-diaza-3-silacyclopentanethione.

13. 2 isobutyl - 3 - methyl-3-n-butoxy-5-n-butyl-2,5-diaza-3-silacyclopentanethione.

References Cited
UNITED STATES PATENTS

| | | | |
|---|---|---|---|
| 3,345,393 | 10/1967 | Simmler et al. | 260—448.2 N |
| 3,479,383 | 11/1969 | Klebe | 260—448.2 N |
| 3,509,193 | 4/1970 | Nieder Prüm et al. | 260—448.2 N |
| 3,539,610 | 11/1970 | Berger | 260—448.2 N |

JAMES E. POER, Primary Examiner

P. F. SHAVER, Assistant Examiner

U.S. Cl. X.R.

260—46.5 E, 448.2 E